United States Patent [19]

Schickle et al.

[11] Patent Number: 4,848,902

[45] Date of Patent: Jul. 18, 1989

[54] DEVICE FOR MEASURING THE INTENSITY PROFILE OF A LASER BEAM

[75] Inventors: Karl Schickle, Pliening; Erwin Strigl, Enzenspergersteasse 6, 8000 München 80, both of Fed. Rep. of Germany

[73] Assignee: Erwin Strigl, Munich, Fed. Rep. of Germany

[21] Appl. No.: 159,701

[22] Filed: Feb. 24, 1988

[30] Foreign Application Priority Data

Feb. 26, 1987 [DE] Fed. Rep. of Germany ....... 3706271

[51] Int. Cl.⁴ .............................................. G01J 1/02
[52] U.S. Cl. ...................................................... 356/121
[58] Field of Search ............................... 356/121–123, 356/213, 218, 222, 225, 226; 350/273, 274; 358/202, 203

[56] References Cited

U.S. PATENT DOCUMENTS

| 1,776,298 | 9/1930 | Strange | 358/203 |
| 1,880,991 | 10/1932 | Sorg | 358/202 |
| 1,998,347 | 4/1935 | von Mihály | 358/203 |
| 4,261,662 | 4/1981 | Bluford, Jr. et al. | |

FOREIGN PATENT DOCUMENTS

| 3005352 | 2/1980 | Fed. Rep. of Germany . | |
| 8227494 | 9/1982 | Fed. Rep. of Germany . | |
| 3510937 | 3/1985 | Fed. Rep. of Germany . | |
| 2574542 | 6/1986 | France | 356/121 |
| 0241125 | 11/1986 | German Democratic Rep. | 356/121 |
| 0070429 | 6/1981 | Japan | 356/121 |
| WO87/01447 | 3/1987 | PCT Int'l Appl. | 356/121 |

OTHER PUBLICATIONS

Burmatov et al., *Pribory & Teknika Eksperimenta*, No. 6, pp. 141–142, Nov.–Dec. 1973, (Translation).

G. Sepold, R. Becker, Laser Magazin, No. 3, 1985, pp. 10–14.

P. Loosen, E. Beyer, R. Kramer, Laser und Optoelektronik, No. 3, 1985, pp. 278–281.

*Primary Examiner*—F. L. Evans
*Attorney, Agent, or Firm*—Irell & Manella

[57] ABSTRACT

A device for measuring the intensity profile of a laser beam (10) comprises an aperture or pinhole diaphragm row which is arranged spirally on a cylindrical surface (20). Within the cylindrical surface (20) a radiation detector (16) is located onto which the laser beam (10) is focussed.

20 Claims, 2 Drawing Sheets

DEVICE FOR MEASURING THE INTENSITY PROFILE OF A LASER BEAM

The invention relates to a device for measuring the intensity profile of a laser beam comprising pinhole diaphragms movable through the laser beam, a means for focussing the laser beam and at least one radiation detector disposed in the beam direction behind the pinhole apertures.

When lasers are used for metal machining, for welding, etc., an exact knowledge of the intensity profile of the laser beam is desirable. When welding with high-power laser beams the welding result depends not only on the laser power but also on the energy flux density distribution over the laser beam cross-section. If the energy flux density distribution over the laser beam cross-section is known it is possible to determine the total laser power therefrom by integration. The energy flux density distribution is also referred to as intensity profile. Since the intensity profile of a laser beam depends on the mode in which the laser operates devices for measuring the intensity profile are also referred to as "mode analyzers".

It is known from the magazine "LASERMAGAZIN", No. 3, 1985, p. 11–14, to measure the intensity profile directly during the working operation, if necessary, to correct said profile (so-called on-line method).

In the magazine "LASER UND OPTOELEKTRONIK", No. 3, 1985, p. 278–281, a review is given of the prior art of measuring laser beam intensity profiles. It is stated therein that in material working with high-power lasers the reflecting workpiece itself forms in addition to the actual laser resonator a further resonator which consists of the coupling-out mirror of the laser resonator, the processing optical system for the laser beam and the reflecting workpiece. Due to this optical reaction from the workpiece a "free" laser beam (i.e. a laser beam not directed onto a workpiece) differs from a laser beam which is used for the material working and which generates reflections at the workpiece.

Thus, for the control and quality assurance of the material working the investigation of the beam quality of the freely running laser beam is not enough. On the contrary, the beam must be investigated directly during the working operation and the laser resonator must be controlled directly on the basis of the investigation result.

The article referred to in the journal "LASER UND OPTOELEKTRONIK" gives a view of conventional methods of diagnosis of laser beams. The known devices for measuring the intensity profile of a laser beam and also the device according to the invention are typically used for $CO_2$ laser radiation with a wavelength of 10.6 $\mu$m or Nd:YAG/glass laser radiation with a wavelength of 1.06 $\mu$m. In addition however other laser radiation can be investigated.

To detect laser radiation various radiation detectors are known, such as thermal detectors or quantum detectors. In thermal detectors the laser radiation is absorbed and the heating thereby caused utilized. The heating can have various effects. In bolometer detectors the heating effects a change in resistance and in thermopile detectors the radiation causes thermoelectric currents whereas in pyroelectric detectors displacement currents occur.

In quantum detectors the internal photoeffect is utilized in a semiconductor material.

Radiation detectors are presumed known for the present invention. Preferably, a pyroelectric detector or a detector array is used.

If a laser beam is to be directly diagnosed during the material working a representative sub-beam must be coupled out of the main beam (which is used for the working). Said subbeam is then examined for its intensity profile which corresponds to the intensity profile of the main beam. Methods for coupling a sub-beam out of the main beam are known per se. It is for example possible by means of a partially reflecting mirror to reflect out from the main beam a sub-beam having an intensity which is only a fraction, for example 0.5%, of the intensity of the main beam.

It is also known to recover the sub-beam to be measured by making one of the two resonator mirrors of the laser resonator such that it allows a small fraction of the total energy, for example 0.5%, to pass whereas the other resonator mirror allows the main beam to pass. The measuring beam then has the same intensity profile as the main beam.

The known devices for measuring the intensity profile of a laser beam set forth in the aforementioned journal "LASER UND OPTOELEKTRONIK", No. 3, 1985, p. 278–1281, each have their specific advantages and disadvantages. The generic type is the so-called Nipkov disc. In the latter, in a planar disc a row of pinhole diaphragms is formed spirally and the disc passes through the beam perpendicular to the axis thereof. The disadvantages of the known method resides in particular in that the movement of a single hole through the beam is not strictly linear but along a circular path. As a result the unidimensional beam profile over which a single hole moves is curved, making the evaluation of the individual unidimensional beam profiles to give a complete intensity profile of the laser beam considerably more difficult.

Devices are also known for measuring the intensity profile of a laser beam in which highly reflecting needles, mirrors of spokes rotating through the laser beam are used (cf. "LASER UND OPTOELEKTRONIK", No. 3, 1985, p. 279 and DE-GM 8,227,494). The use of rotating needles, mirrors and the like has however the disadvantage that even the slightest change of the reflection properties of the needles or the mirror leads to a falsification of the measurement result.

The invention is based on the problem of providing a device for measuring the intensity profile of a laser beam which can be made economically, furnishes a signal which is simple to evaluate, ensures accurate measurement results and permits high recording speed.

According to the invention in a device comprising pinhole diaphragms movable through the laser beam, a means for focussing the laser beam and at least one radiation detector disposed in the beam direction behind the pinhole apertures this problem is solved in that the pinhole diaphragms are formed in a thin foil, preferably a metal foil, which is moved on a path curved in space.

The invention thus differs from the "rotating needle methods" ("LASER UND OPTOELEKTRONIK", No, 3, 1985," p. 279, FIG. 4c) in that no rotating reflectors are moved through the laser main beam and no deflection mirrors are necessary.

The device according to the invention differs from the socalled Nipkov disc in that the pinhole diaphragms are not arranged in a plane but on a curved surface. This makes it possible to scan the intensity profile of the laser beam linearly (i.e. avoid the curved paths of the Nipkov disc). The use of a thin foil and the curvature thereof with respect to the focussed beam reduces imaging errors compared with a Nipkov disc.

In a preferred further development of the invention the pinhole diaphragms or apertures are disposed in a circularly cylindrical surface (drum). The detector is located in the interior of the drum and the focussing means on the outside.

To avoid superpositionings of the initially unidimensional beam profiles generated by the individual apertures of the pinhole diaphragm row in a preferred further development of the invention the pinhole diaphragms are arranged in the cylindrical surface in such a manner that on their movement through the laser beam at a given instant not more than one hole is in the beam. For this purpose the holes are arranged for example spirally in the cylindrical surface.

Hereinafter examples of embodiment of the invention will be explained in detail with the aid of the schematic drawings, wherein.

Figure 1:
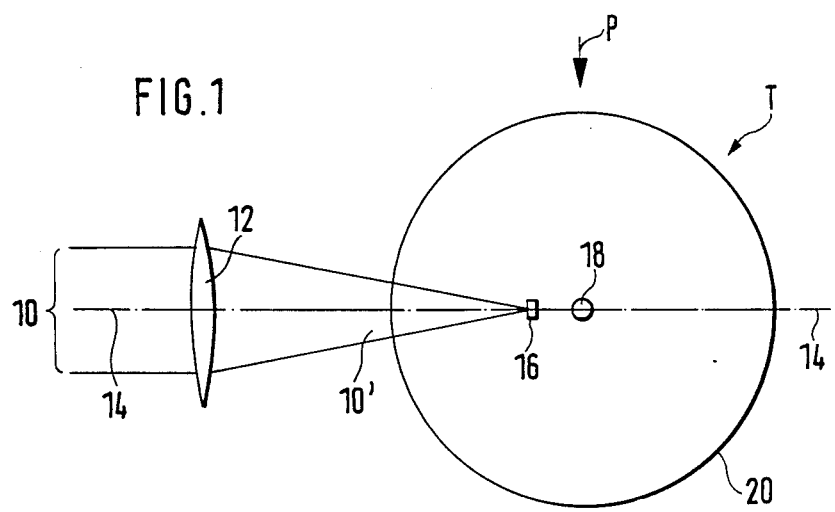
FIG. 1 shows schematically a device for measuring the intensity profile of a laser beam.

The laser beam 10 shown in FIG. 1 has already been coupled out of a main beam (not shown) in one of the manners described at the beginning. The laser beam 10 is thus representative of the main beam but has only a fraction of its intensity, for example 0.5%. By a focussing means, such as a collecting lens 12, the laser beam 10 is focussed onto a radiation detector 16 arranged on the optical axis 14. The radiation detector 16 is a pyroelectric detector or a bolometric detector.

The detector 16 is arranged in a circularly cylindrical drum T (FIG. 1). The drum T rotates about its axis 18 and its surface forms a cylindrical surface 20 in which apertures or pinhole diaphragms 22 are formed according to FIG. 2. The laser beam focussed onto the drum is denoted by 10'. The detector 16 is preferably positioned between the focus of the beam 10 and the pinhole diaphragms 22.

Figure 3:
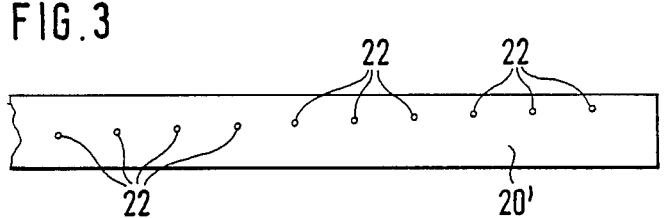
FIG. 3 shows a development of the aperture or pinhole diaphragm row used in a device according to FIGS. 1 and 2.

FIG. 3 shows a development of a foil 20' placed on the surface 20 and having the aperture row 22.

The pinhole diaphragms 22 are formed according to FIG. 3 spirally as aperture row round the rotation axis 18 of the drum T in such a manner that on rotation of the drum 20 only a single aperture 22 is located in the laser beam 10.

To minimize diffraction effects at the detector 16 the diameter of the pinhole diaphragms 22 and the spacing between the surface 20 and the detector 16 are selected in accordance with the laser radiation to be measured.

It is essential that all the pinhole apertures 22 have exactly the same size areas.

To avoid shadow formations and other measurement falsifications the pinhole diaphragms 22 are formed in a foil which is as thin as possible. The foil 20' is preferably a thin metal foil whose thickness is less than 100 μm, and preferably less than 10 μm.

Figure 4:
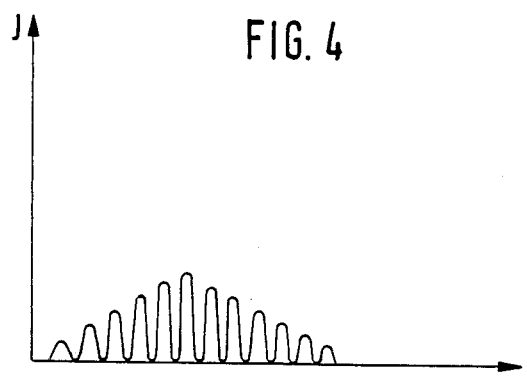
FIG. 4 is a typical measurement signal recovered with a device according to FIGS. 1 to 3.
Figure 5:
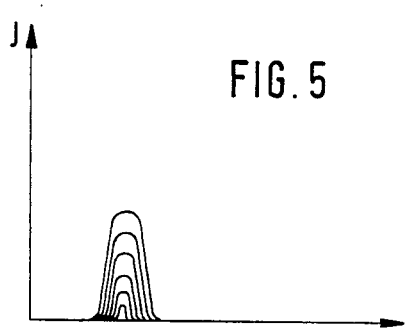
FIG. 5 shows the measurement signal illustrated in FIG. 4 in a processed form.

For measuring the laser beam 10 the drum is positioned in such a manner that on rotation thereof the individual pinhole diaphragms 22 pass successively through the entire laser beam in "slice manner", individual "unidimensional" intensity distributions represented in FIG. 4 being recovered in dependence upon the relative position between the individual pinhole diaphragms 22 and the beam 10. The entire measurement result shown in FIG. 4 permits a three-dimensional representation of the intensity profile of the beam. In FIG. 5 the individual unidimensional intensity profiles according to FIG. 4 are arranged in series and in each case a slight displacement of the individual profiles has been made in the direction of the location axis to obtain a quasi perspective representation of the intensity profile.

With the device various laser beams can be measured. When the laser beam is changed the collecting lens 12 is also changed.

It is possible to arrange the drum T displaceably between the detector 16 and the lens 12 so that the beam can be imaged with different diameter on the surface 20 of the drum T and thus the scanned sub-beam profiles are variable.

The diameter of the holes is for example 80 μm.

Figure 2:
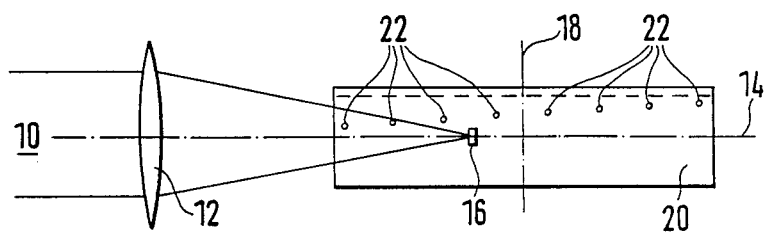
FIG. 2 shows the device according to FIG. 1 from above, i.e. in the direction of the arrow P of FIG. 1.
Figure 6:
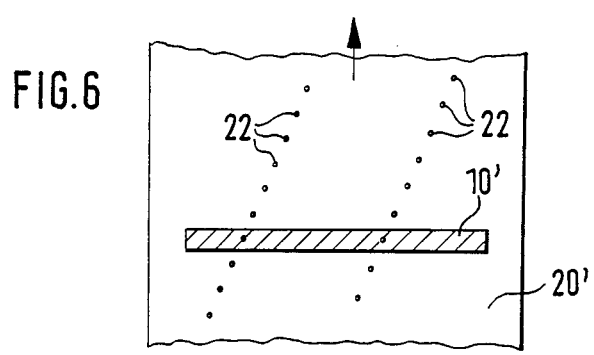
FIG. 6 shows a further example of embodiment of a device for measuring the intensity profile of a laser beam.

FIG. 6 shows a further example of embodiment of a device for measuring the intensity profile of a laser beam which differs from the example of embodiment shown in FIGS. 1 to 3 in that for focussing the laser beam 10 a cylindrical lens is used which generates on the foil 20' an elongated shallow beam cross-section 10'. Otherwise the view according to FIG. 6 corresponds to the view according to FIG. 3. The detector used is an elongated detector array.

In both examples of embodiment a thin metal foil having a thickness of about 5 μm is used for the foil 20'.

We claim:

1. Device for measuring the intensity profile of a laser beam (10) comprising pinhole apertures (22) movable through the laser beam, a means (12) for focusing the laser beam (10) and at least one radiation detector (16) disposed in the beam direction behind the pinhole apertures (22), characterized in that the pinhole apertures (22) are formed in a thin foil (20') which is moved, wherein the thin foil is of generally cylindrical form and in that the radiation detector (16) is arranged within said cylindrical foil.

2. Device according to claim 1, characterized in that the pinhole apertures (22) are arranged in such a manner that in their movement at any instant not more than one hole is in the beam.

3. Device according to claim 1, characterized in that the pinhole apertures (22) are arranged spirally.

4. Device according to claim 1, characterized in that the detector (16) is arranged at least approximately in the focus of the beam (10).

5. Device according to claim 1, characterized in that the detector (16) is arranged between the focus of the beam (10) and the pinhole apertures (22).

6. Device according to claim 1, characterized in that as foil (20') a thin metal foil is provided whose thickness is less than 100 μm, preferably less than 10 μm.

7. Device according to claim 1, characterized in that a plurality of detectors is provided.

8. Device according to claim 1, characterized in that the pinhole aperture (22) are arranged in one or more rows.

9. Device for measuring the intensity profile of a laser beam (10) comprising pinhole apertures (22) movable through the laser beam, a means (12) for focusing the laser beam (10) and at least one radiation detector (16) disposed in the beam direction behind the pinhole apertures (22), characterized in that the pinhole apertures (22) are formed in a thin foil (20') which is moved, wherein the thin foil is of generally cylindrical form and in that the light to be detected by said radiation detector (16) is received within said cylindrical foil.

10. Device according to claim 9, characterized in that the cylindrical surface (20) is circularly cylindrical.

11. Device according to claim 9, characterized in that the cylindrical surface (20) is arranged in the beam (10) between the focussing means (12) and the detector (16).

12. Device according to claim 9, characterized in that the pinhole apertures (22) are arranged in such a manner that in their movement at any instant not more than one hole is in the beam.

13. Device according to claim 11, characterized in that the pinhole apertures (22) are arranged in such a manner that in their movement at any instant not more than one hole is in the beam.

14. Device according to claim 9, characterized in that the detector (16) is arranged at least approximately in the focus of the beam (10).

15. Device according to claim 11, characterized in that the detector (16) is arranged at least approximately in the focus of the beam (10).

16. Device according to claim 9, characterized in that the detector (16) is arranged between the focus of the beam (10) and the pinhole apertures (22).

17. Device according to claim 11, characterized in that the detector (16) is arranged between the focus of the beam (10) and the pinhole apertures (22).

18. Device according to claim 9, characterized in that a plurality of detectors is provided.

19. Device according to claim 11, characterized in that a plurality of detectors is provided.

20. Device according to claim 9, characterized in that the pinhole apertures (22) are arranged in one or more rows.

* * * * *